US011580621B2

(12) United States Patent
Lung et al.

(10) Patent No.: US 11,580,621 B2
(45) Date of Patent: Feb. 14, 2023

(54) AI FRAME ENGINE FOR MOBILE EDGE

(71) Applicant: MEDIATEK INC., Hsinchu (TW)

(72) Inventors: Jen Cheng Lung, Hsinchu (TW);
Pei-Kuei Tsung, Hsinchu (TW);
Chih-Wei Chen, Hsinchu (TW);
Yao-Sheng Wang, Hsinchu (TW);
Shih-Che Chen, Hsinchu (TW);
Yu-Sheng Lin, Hsinchu (TW);
Chih-Wen Goo, Hsinchu (TW);
Shih-Chin Lin, Hsinchu (TW); Huang Tsung-Shian, Hsinchu (TW);
Ying-Chieh Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 92 days.

(21) Appl. No.: 17/113,397

(22) Filed: Dec. 7, 2020

(65) Prior Publication Data
US 2021/0174473 A1 Jun. 10, 2021

Related U.S. Application Data

(60) Provisional application No. 62/944,415, filed on Dec. 6, 2019.

(51) Int. Cl.
*G06T 5/00* (2006.01)
*G06T 3/00* (2006.01)
(Continued)

(52) U.S. Cl.
CPC ............ *G06T 5/002* (2013.01); *G06T 3/0093* (2013.01); *G06T 3/4053* (2013.01); *G06T 5/50* (2013.01);
(Continued)

(58) Field of Classification Search
CPC ... G06T 7/20–292; G06T 3/40; G06T 3/4007; G06T 3/4053–4076;
(Continued)

(56) References Cited

U.S. PATENT DOCUMENTS

2011/0310302 A1* 12/2011 Takeuchi ............. H04N 9/8205
348/584
2017/0353666 A1* 12/2017 Numata ............ H04N 5/23229
2020/0327639 A1* 10/2020 Walvoord ................ G06N 3/08

FOREIGN PATENT DOCUMENTS

CN 105850133 A 8/2016
CN 111133747 A 5/2020

OTHER PUBLICATIONS

Puglisi, Giovanni, and Sebastiano Battiato. "A robust image alignment algorithm for video stabilization purposes." IEEE Transactions on Circuits and Systems for Video Technology 21.10 (2011): 1390-1400. (Year: 2011).*

(Continued)

*Primary Examiner* — Geoffrey E Summers
(74) *Attorney, Agent, or Firm* — Oblon, McClelland, Maier & Neustadt, L.L.P.

(57) ABSTRACT

Aspects of the disclosure provide a device for processing frames with aliasing artifacts. For example, the device can include a motion estimation circuit, a warping circuit coupled to the motion estimation circuit, and a temporal decision circuit coupled to the warping circuit. The motion estimation circuit can estimate a motion value between a current frame and a previous frame. The warping circuit can warp the previous frame based on the motion value such that the warped previous frame is aligned with the current frame and determine whether the current frame and the warped previous frame are consistent. The temporal decision circuit can generate an output frame, the output frame including either the current frame and the warped previous frame
(Continued)

when the current frame and the warped previous frame are consistent, or the current frame when the current frame and the warped previous frame are not consistent.

12 Claims, 7 Drawing Sheets

(51) Int. Cl.
  *G06T 7/254* (2017.01)
  *G06T 3/40* (2006.01)
  *G06T 5/50* (2006.01)
(52) U.S. Cl.
  CPC .... *G06T 7/254* (2017.01); *G06T 2207/20084* (2013.01); *G06T 2207/20224* (2013.01)
(58) Field of Classification Search
  CPC ....... G06T 3/4046; G06T 3/0068–0081; G06T 3/0093; G06T 7/30–38; G06T 2207/20081; G06T 2207/20084; G06T 5/002; G06T 5/50; G06T 2207/20224; G06T 2207/10016; G06T 2207/20182
  See application file for complete search history.

(56) References Cited

OTHER PUBLICATIONS

Sajjadi, Mehdi SM, Raviteja Vemulapalli, and Matthew Brown. "Frame-Recurrent Video Super-Resolution." arXiv preprint arXiv:1801.04590v4 (2018). (Year: 2018).*

Setkov, Alexander. "Matching quality investigation of Motion Estimation Algorithms." 9th conference of open innovations community fruct. 2011. (Year: 2011).*

Zhan, Zongqian, et al. "Video deblurring via motion compensation and adaptive information fusion." Neurocomputing 341 (2019): 88-98. (Year: 2019).*

Combined Taiwanese Office Action and Search Report dated May 10, 2022 in Patent Application No. 110139994 (with English translation of Category of Cited Documents), 11 pages.

* cited by examiner

AI FRAME ENGINE FOR MOBILE EDGE

INCORPORATION BY REFERENCE

This present disclosure claims the benefit of U.S. Provisional Application No. 62/944,415, "AI frame Engine for Mobile Edge" filed on Dec. 6, 2019, which is incorporated herein by reference in its entirety.

TECHNICAL FIELD

The present disclosure relates to images processing techniques, and, more particularly, to an artificial intelligence (AI) engine for processing images with aliasing artifacts.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Images or frames can be displayed on a mobile phone. The frames can include a streaming of video frames that come from a cloud source via Internet and game videos that are generated by a processor, e.g., a graphics processing unit (GPU), of the mobile phone. Restricted by the bandwidth of the Internet and the size and resolution of the mobile phone, the video frames and the game frames may have low resolution and aliased quality.

SUMMARY

Aspects of the disclosure provide a device for processing frames with aliasing artifacts. The device can include a motion estimation circuit that is configured to receive a current frame and at least a previous frame and estimate a motion value between the current frame and the previous frame. The device can also include a warping circuit coupled to the motion estimation circuit. The warping circuit can be configured to warp the previous frame based on the motion value such that the warped previous frame is aligned with the current frame. The warping circuit can be further configured to determine whether the current frame and the warped previous frame are consistent. The device can also include a temporal decision circuit coupled to the warping circuit that is configured to generate an output frame. For example, the output frame can include the current frame and the warped previous frame when the current frame and the warped previous frame are consistent. As another example, the output frame can include only the current frame when the current frame and the warped previous frame are not consistent.

In an embodiment, the device can further include a frame processor coupled to the temporal decision circuit that is configured to process the output frame. For example, the frame processor can include a super-resolution (SR) and anti-aliasing (AA) engine configured to enhance resolution and remove aliasing artifacts of the output frame to generate a first high-resolution frame with aliasing artifacts and a second high-resolution frame with aliasing artifacts removed. As another example, the frame processor can further include an attention reference frame generator coupled to the SR and AA engine that is configured to generate an attention reference frame based on the first high-resolution frame and the second high-resolution frame. In an embodiment, the frame processor can further include an artificial intelligence (AI) neural network (NN) coupled to the attention reference frame generator that is configured to remove aliasing artifacts of a frame based on the attention reference frame.

In an embodiment, the device can further include a frame fusion engine coupled to the temporal decision circuit that is configured to fuse the current frame and the warped previous frame. For example, the frame fusion engine can fuse the current frame and the warped previous frame by concatenating the warped previous frame to the current frame in a channel-wise manner.

In another embodiment, the motion estimation circuit can estimate the motion value between the current frame and the previous frame using a sum of absolute difference (SAD) method. For example, the warping circuit can warp the previous frame based on the motion value when the previous frame after being warped the motion value matches the current frame. As another example, the warping circuit warps the previous frame based on the motion value when the motion value is less than a motion threshold. As another example, the temporal decision circuit can be further coupled to the motion estimation circuit, the temporal decision circuit generating the output frame that includes the current frame when the motion value is not less than the motion threshold. In a further embodiment, the motion estimation circuit is an NN.

Aspects of the disclosure provide a frame processor for processing frames with aliasing artifacts. The frame processor can include an SR and AA engine configured to enhance resolution and remove aliasing artifacts of a frame to generate a first high-resolution frame with aliasing artifacts and a second high-resolution frame with aliasing artifacts removed. The frame processor can also include an attention reference frame generator coupled to the SR and AA engine that is configured to generate an attention reference frame based on the first high-resolution frame and the second high-resolution frame. For example, the SR and AA engine can include an SR engine that is an AI SR engine, the first and second high-resolution frames having their resolution enhanced by the AI SR engine. As another example, the SR and AA engine can include an AI engine that is an AI AA engine, the second high-resolution frame having the aliasing artifacts removed by the AI AA engine.

In an embodiment, the frame processor can further include an AI NN coupled to the attention reference frame generator that is configured to remove aliasing artifacts of a frame based on the attention reference frame.

Aspects of the disclosure provide a method for processing frames with aliasing artifacts. The method can include estimating a motion value between a current frame and at least a previous frame. The method can also include warping the previous frame based on the motion value such that the warped previous frame is aligned with the current frame. The method can also include generating an output frame. For example, the output frame can include the current frame and the warped previous frame when the current frame and the warped previous frame are consistent. As another example, the output frame can include only the current frame when the current frame and the warped previous frame are not consistent.

In an embodiment, the method can further include enhancing resolution and removing aliasing artifacts of the output frame to generate a first high-resolution frame with aliasing artifacts and a second high-resolution frame with aliasing artifacts removed. In another embodiment, the method can further include generating an attention reference frame based on the first high-resolution frame and the second high-resolution frame. In a further embodiment, the method can further include removing aliasing artifacts of a frame based on the attention reference frame.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Super-resolution (SR) techniques can reconstruct a high-resolution image from a low-resolution image, which may be captured by an image capturing device with inadequate sensors. Anti-aliasing (AA) techniques can improve the quality of the low-resolution image with aliasing artifacts. However, after the SR and AA operation some information of the image may be lost. For example, when an object, such as air stairs, in an original image (e.g., a current frame of a streaming of consecutive frames) is moving horizontally, some vertical parts of the air stairs, such as balusters, may be vanished and not shown in the processed image with the aliasing artifacts removed. Instead of processing only the original image during the SR and AA operation, the disclosure can further take at least an additional image (e.g., a previous frame of the streaming of consecutive frames) into consideration when the additional image and the original image satisfy some requirements. In an embodiment, motion data between the additional image and the original image can be determined first, then the additional image can be warped based on the motion data such that the warped additional image can be aligned with the original image, and the warped additional image can be further used in the SR and AA operations performed on the original image when the warped additional image and the original image are consistent. According to some other embodiments of the disclosure, a frame with its resolution enhanced can be compared with the frame with its aliasing artifacts removed to generate an attention reference frame, which includes key distinguishable information between these two frames. In an embodiment, the attention reference frame can be used to train a neural network (NN), and then the trained NN can enhance resolution of the another frame and remove the aliasing artifacts of the another frame with its resolution enhanced by only focusing on the another frame with respect to the key information contained in the attention reference frame.

In most digital imaging applications, digital images with a higher resolution are always desirable for subsequent image processing and analysis. The higher the resolution of a digital image, the more details of the digital image. The resolution of a digital image can be classified into, for example, pixel resolution, spatial resolution, temporal resolution and spectral resolution. The spatial resolution can be limited by image capturing devices and image displaying devices. For example, charge-coupled devices (CCDs) and complementary metal-oxide-semiconductors (CMOSs) are the most widely used image sensors in an image capturing device. The sensor size and the number of sensors per unit area can determine the spatial resolution of an image that an image capturing device captures. An image capturing device with a high sensor density can generate high-resolution images, but consume much power and have high hardware cost.

An image capturing device with inadequate sensors can generate low-resolution images. A low-resolution image thus generated will have distortion artifacts or jagged edges known as aliasing that occur whenever a non-rectangular shape is created with pixels that are located in exact rows and columns. Aliasing occurs when representing a high-resolution image at a lower resolution. Aliasing may be distracting for PC or mobile device users.

Figure 1:
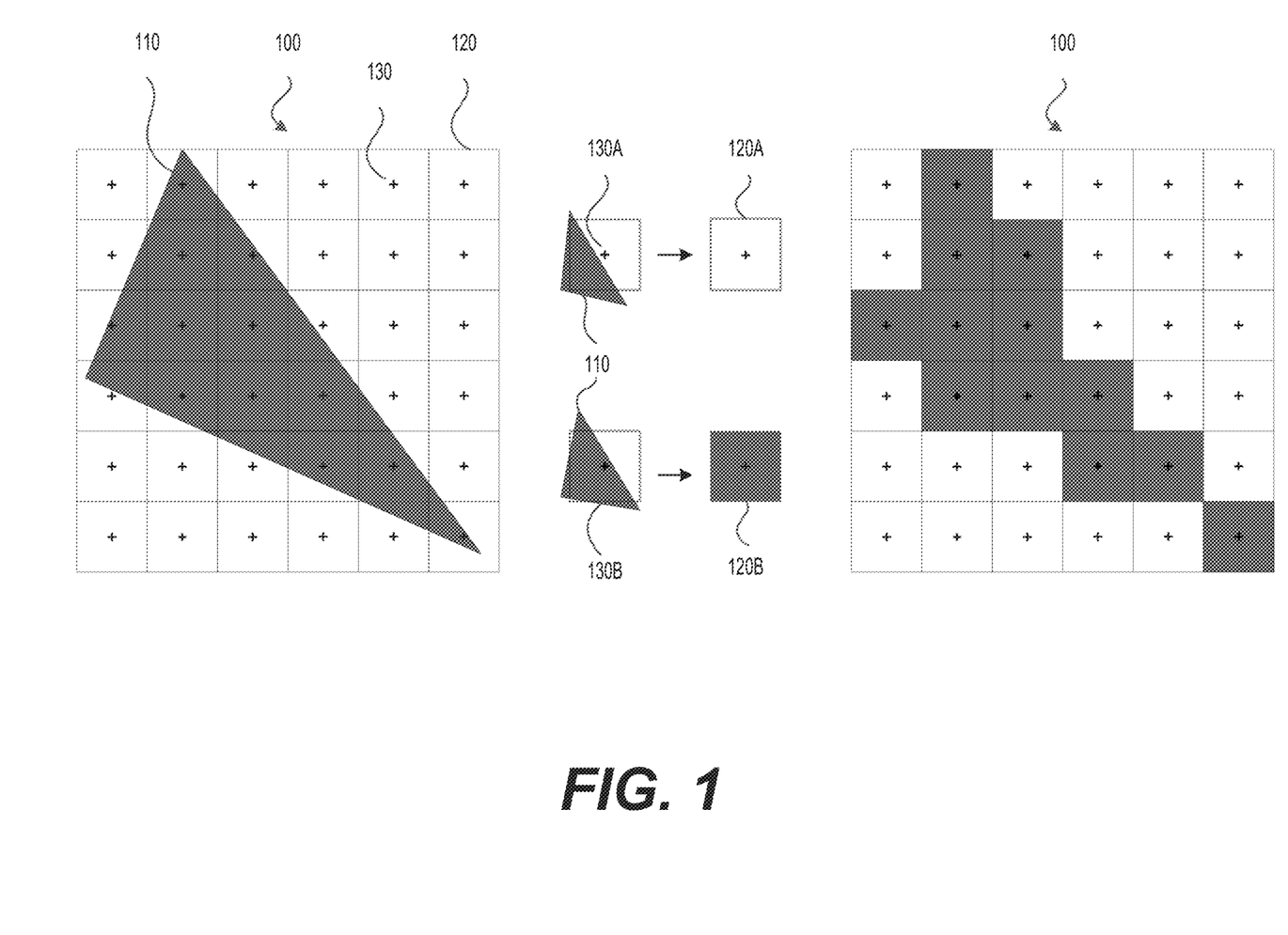
FIG. 1 illustrates how an exemplary virtual high-resolution image can be displayed on a low-resolution raster display according to some embodiments of the disclosure.

FIG. 1 illustrates how an exemplary virtual high-resolution image 110 can be displayed on a low-resolution raster display 100 according to some embodiments of the disclosure. The display 100 can have a plurality of pixel 120 that are arranged in rows and columns. The crosses "+" represent sample points 130 of the pixels 120 that are used to determine if a fragment will be generated for a pixel. For example, when a sample point 130A is not covered by the image 110, e.g., a triangle primitive, no fragment will be generated for a pixel 120A with the sample point 130A, even though a portion of the pixel 120A is covered by the triangle 110; when a sample point 130B is covered by the triangle 110, a fragment will be generated for a pixel 120B with the sample point 130B, even though a portion of the pixel 120B is not covered by the triangle 110. The triangle 110 thus rendered on the display 100 is shown having jagged edges.

Figure 2:
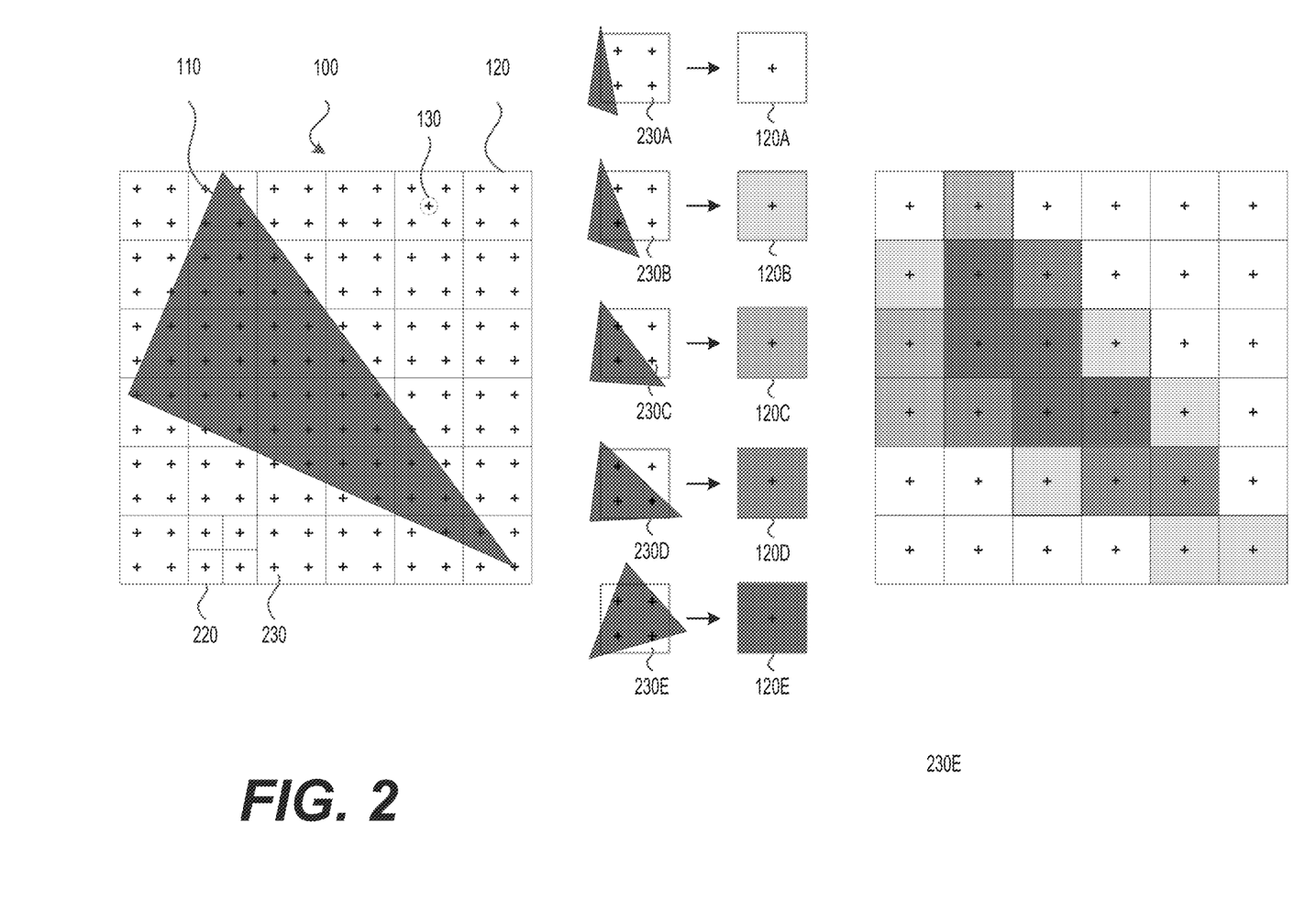
FIG. 2 illustrates how an exemplary rectangle can be displayed on a low-resolution raster display with multi-solution anti-aliasing (MSAA) applied according to some embodiments of the disclosure.

Anti-aliasing is a technique to solve the jaggies issue by oversampling an image at a rate higher than an intended final output and thus smoothing out the jagged edges of the image. For example, multisample anti-aliasing (MSAA), one of a variety of supersampling anti-aliasing (SSAA) algorithms proposed to address the aliasing occurring at the edges of the triangle 110, can simulate each pixel of a display as having a plurality of subpixels and determine the color of the pixel based on the number of the subpixels that are covered by an object image. FIG. 2 illustrates how the exemplary rectangle 110 can be displayed on the low-resolution raster display 100 with MSAA applied according to some embodiments of the disclosure. MSAA can simulate each pixel 120 as having 2×2 subpixels 220, each of which has a subsample point 230, and determine the color of the pixel 120 based on the number of the subsample points 230 that are covered by the rectangle 110. For example, when no subsample point 230A is covered by the triangle 110, no fragment will be generated for a pixel 120A with the sample points 230 and the pixel 120A is blank; when only one subsample point 230B is covered by the triangle 110, a pixel 120B with the sample points 230B will have a light color, e.g., one fourth of the color of the rectangle 110, which can be estimated by a fragment shader; when only two subsample points 230C are covered by the triangle 110, a pixel 120C with the sample points 230C will have a darker color than the pixel 120B, e.g., one half of the color of the rectangle 110; when as many as three subsample points 230D are covered by the triangle 110, a pixel 120D with the sample points 230D will have a darker color than the pixel 120C, e.g., three fourths of the color of the rectangle 110; when all of subsample points 230E are covered by the triangle 110, a pixel 120E with the sample points 230E will be have the darkest color the same as the pixel 120B shown in FIG. 1. The triangle 110 thus rendered on the display 100 with MSAA applied is shown having smoother edges than the triangle 110 rendered on the display 100 of FIG. 1 without MSAA applied.

As shown in FIG. 2, each pixel 120 takes a regular grid of 2×2 subsample points 220 to determine its color. In an embodiment, each pixel 120 can also take 1×2, 2×1, or a regular grid of 4×4 or 8×8 subsample points 230 to determine its color. In another embodiment, each pixel 120 can also use 4-Rook of 2×2 subsample points 230 (i.e., rotated grid supersampling, RGSS), and five subsample points 230 (e.g., quincunx anti-aliasing), four of which are shared with four other pixels each. As the number of subpixels increases, the computation becomes expensive and a large memory is required.

MSAA can be performed via an artificial intelligence (AI) processor, such as a convolution accelerator and a graphics processing unit (GPU), which is designed to accelerate the creation of images in an image buffer intended to be output to a display, to offload the graphics processing from a central processing unit (CPU). A desktop GPU can use immediate-mode rendering. The immediate-mode GPU needs an off-chip main memory, e.g., a DRAM, to store a great amount of multisampled pixel data, and has to access the DRAM to fetch from the multisampled pixel data the pixel coordinate of the current fragment for every fragment shading, which consumes a lot of bandwidth. A mobile tile-based GPU is proposed to minimize the amount of external memory accesses the GPU needs during fragment shading. The tile-based GPU moves an image buffer out of the off-chip memory and into a high-speed on-chip memory, i.e., a tile buffer, which needs less power to be accessed. The size of the tile buffer can vary among GPUs but can be as small as 16×16 pixels. In order to use such a small tile buffer, the tile-based GPU splits a render target into small tiles, and renders one tile at a time. Once the rendering is complete, the tile is copied out to the external memory. Before splitting the render target, the tile-based GPU has to store a large amount of geometry data, i.e., per-vertex varying data and tiler intermediate states, to the main memory, which will compromise the bandwidth savings for the image buffer data.

Figure 3:
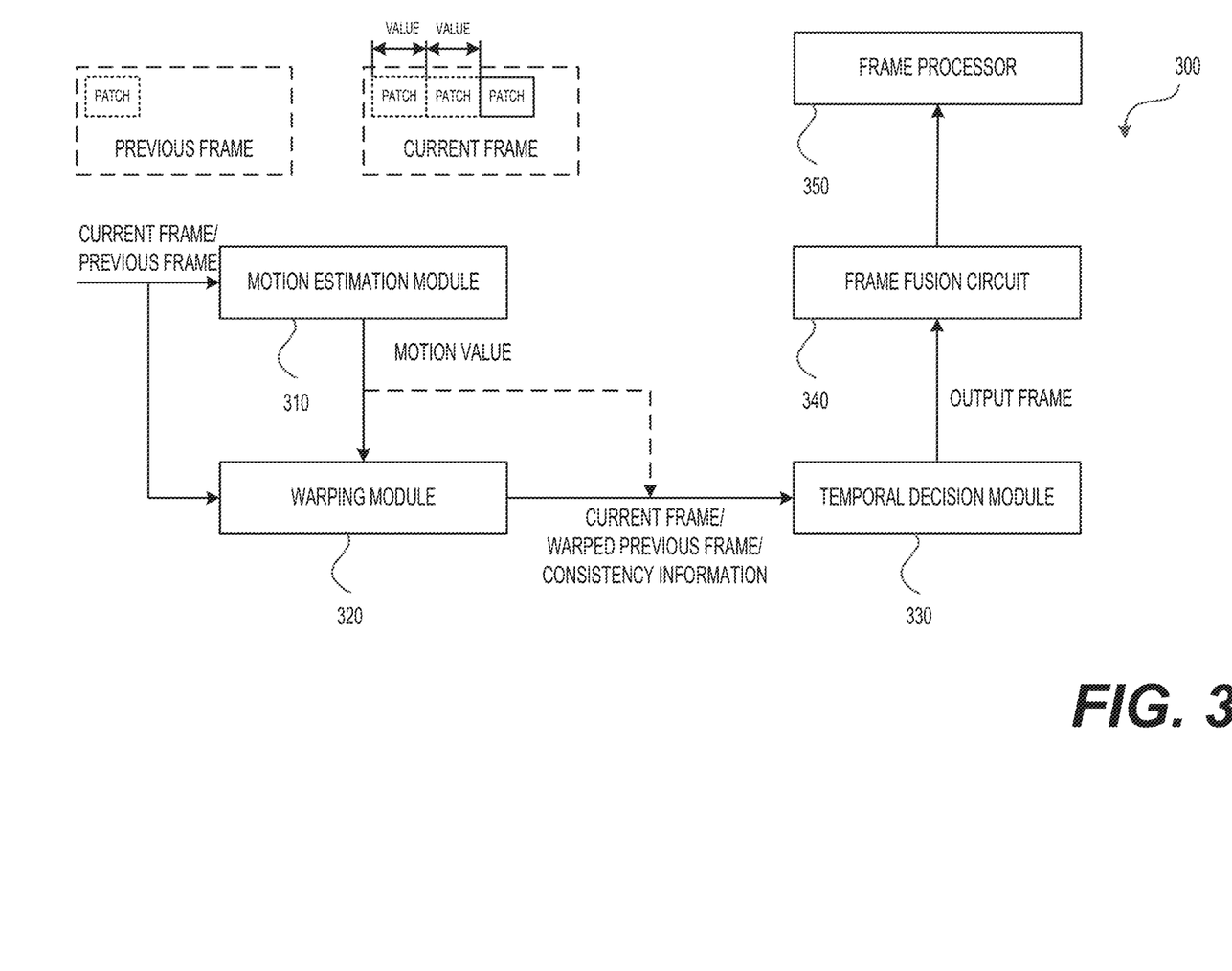
FIG. 3 shows a functional block diagram of an exemplary device for processing frames with aliasing artifacts according to some embodiments of the disclosure.

FIG. 3 shows a functional block diagram of an exemplary device 300 for processing images or frames with aliasing artifacts according to some embodiments of the disclosure. The device 300 can enhance resolution (e.g., via a super-resolution technique) of a current frame and remove aliasing artifacts of the enhanced-resolution current frame by processing either the current frame only or the current frame and a previous frame that has been warped and aligned with the current frame, in order to retain the information contained in the current frame as much as possible. For example, the device 300 can include a motion estimation circuit 310, a warping circuit 320, and a temporal decision circuit 330.

The motion estimation circuit 310 can receive a plurality of successive images or frames including at least a current frame and a previous frame. For example, the current frame and the previous frame can be a streaming of video frames, which may be low-resolution and have aliased quality, from a cloud source via Internet. As another example, the current frame and the previous frame can be game frames that are generated by a processor, e.g., a GPU, of a mobile phone. Restricted by the size and resolution of the mobile phone, the game frames may also be low-resolution and thus have aliased quality. The motion estimation circuit 310 can estimate a motion value between the current frame and the previous frame. For example, the motion value can include a direction in which the previous frame moves to the current frame and how far, e.g., a number of pixels, the previous frame has moved to the current frame. In an embodiment, the motion estimation circuit 310 can be a neural network that can be trained to estimate the motion value between the current frame and the previous frame. In another embodiment, the motion estimation circuit 310 can estimate the motion data using a sum of absolute differences (SAD) method, a mean absolute difference (MAD) method, a sum of squared differences (SSD) method, a zero-mean SAD method, a locally scaled SAD method or a normalized cross correlation (NCC) method. For example, in the SAD operation a patch of the previous frame can be extracted and shifted a value rightward, and a first sum of absolute differences between each corresponding pair of pixels of the shifted patch of the previous frame and a corresponding patch of the current frame can be calculated. The shifted patch of the previous frame can be further shifted the value rightward, and a second sum of absolute differences between each corresponding pair of pixels of the further shifted patch of the previous frame and the corresponding patch of the current frame can also be calculated. A motion value can be equal to the value when the first sum is less than the second sum or be equal to double the value when the second sum is less than the first sum.

The warping circuit 320 can be coupled to the motion estimation circuit 310, and warp the previous frame based on the motion value such that the warped previous frame is aligned with the current frame. For example, the warping circuit 320 can geometrically align the texture/shape of the previous frame to the current frame based on the motion value. In an embodiment, the warping circuit 320 can warp the previous frame rightward based on the value when the first sum is less than the second sum. In another embodiment, the warping circuit 320 can warp the previous frame double the value rightward when the second sum is less than the first sum. For example, the warping circuit 320 can linearly interpolate pixels along the rows of the previous frame and then interpolate along the columns to assign to reference pixel positions in the current a value that is a bilinear function of the four pixels nearest S in the previous frame, and uses the 16 nearest neighbors in the bicubic interpolation and uses bicubic waveforms to reduce resampling artifacts. In an embodiment, the warping circuit 320 can warp the previous frame when the shifted previous frame matches the current frame. For example, the warping circuit 320 can warp the previous frame rightward based on the value when the first sum is less than the second sum and is less than a sum threshold. As another example, the warping circuit 320 can warp the previous frame rightward based on double the value when the second sum is less than the first sum and is less than the sum threshold. In another embodiment, the warping circuit 320 can warp the previous frame when the motion value is less than a motion threshold. For example, the motion threshold can be triple the value, and the warping circuit 320 do not warp the previous frame rightward based on triple the value, regardless of whether a third sum of absolute differences between each corresponding pair of pixels of the patch of the previous frame shifted triple the value rightward and a corresponding patch of the current frame is less than the first sum, the second sum and the sum threshold. In a further embodiment, the warping circuit 320 can also determine whether the current frame and the warped previous frame are consistent. For example, the warping circuit 320 can determine consistency information of the current frame and the warped previous frame based on cross-correlation between the current frame and the warped previous frame. For example, the warping circuit 320 can determine that the warped previous frame and the current frame are consistent when the cross-correlation exceeds a threshold value.

The temporal decision circuit 330 can be coupled to the warping circuit 320 and configured to generate an output frame. For example, the output frame can include the current frame and the warped previous frame when the current frame and the warped previous frame are consistent. As another example, the output frame can include only the current frame when the current frame and the warped previous frame are not consistent. In some embodiment, the temporal decision circuit 330 can be further coupled to the motion estimation circuit 310, and the output frame can include only the current frame when the motion value is equal to or exceeds the motion threshold.

As shown in FIG. 3, the device 300 can further include a frame fusion circuit 340. The frame fusion circuit 340 can be coupled to the temporal decision circuit 330 and fuse the output frame that includes the current frame and the warped previous frame. For example, the frame fusion circuit 340 can concatenate the warped previous frame to the current frame in a channel-wise manner. As another example, the frame fusion circuit 340 can add the warped previous frame to the current frame to generate a single frame.

As shown in FIG. 3, the device 300 can further include a frame processor 350. The frame processor 350 can be coupled to the frame fusion circuit 340 and process frames output from the frame fusion circuit 340, which can be the current frame, the current frame concatenated with the warped previous frame, or the single frame. For example, the frame processor 350 can resize or enhance resolution of the current frame and remove aliasing artifacts of the current frame with its resolution enhanced. In an embodiment, the frame fusion circuit 340 can be omitted, and the frame processor 350 can be coupled to the temporal decision circuit 330 directly and process either the current frame or the current frame and the warped previous frame. As the warped previous frame can also be generated by the warping circuit 320 and be output to the frame processor 350 when the warped previous frame is consistent with the current frame, the frame processor 350 can enhance the resolution of the current frame and remove the aliasing artifacts of the enhanced-resolution current frame by further taking the warped previous frame into consideration. In such a scenario, less information of the processed current frame will be lost, as compared with the current frame that is processed by considering the current frame only.

Figure 4:
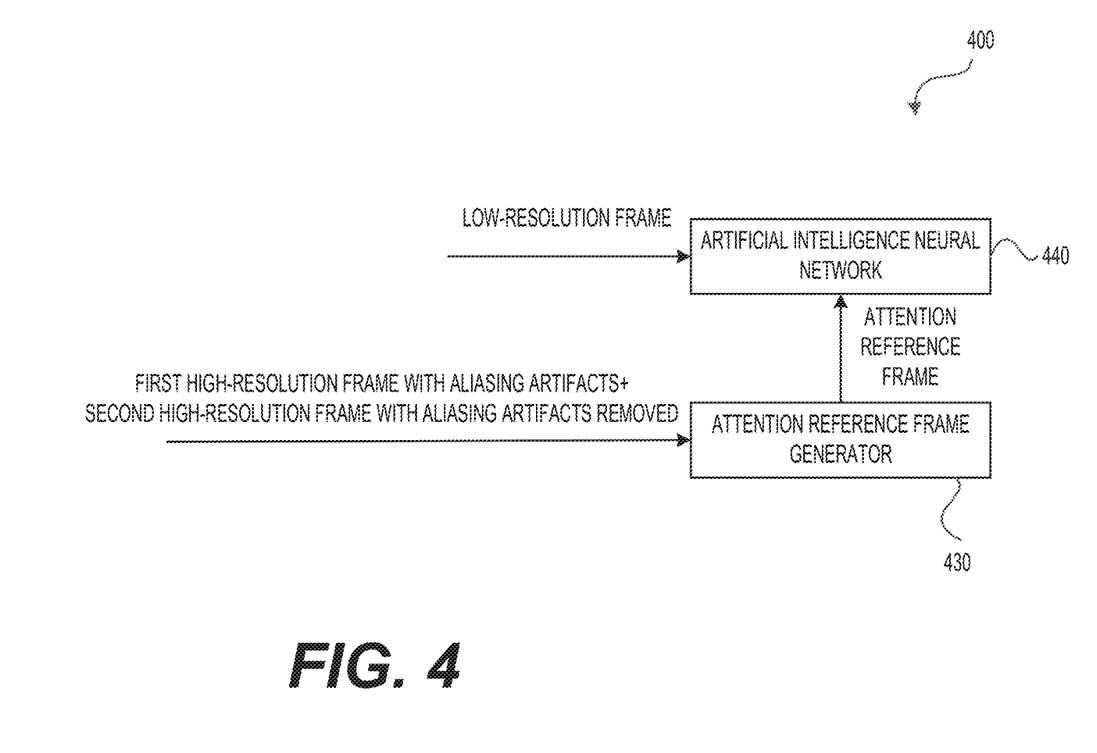
FIG. 4 shows a functional block diagram of an exemplary frame processor for processing frames with aliasing artifacts according to some embodiments of the disclosure.

FIG. 4 shows a functional block diagram of an exemplary frame processor 400 for processing images or frames with aliasing artifacts according to some embodiments of the disclosure. The frame processor 400 can be coupled to the temporal decision circuit 330 or to the frame fusion circuit 340 of the device 300. The frame processor 400 can include an attention reference frame generator 430 and an artificial intelligence (AI) neural network (NN) 440 coupled to the attention reference frame generator 430. The attention reference frame generator 430 can generate an attention reference frame based on a first high-resolution frame with aliasing artifacts and a second high-resolution frame with aliasing artifacts removed. For example, the attention reference frame generator 430 can compare the first frame and the second frame to capture key information of the first frame that is distinguishable from the second frame. The AI NN 440 can remove aliasing artifacts of another frame, e.g., a low-resolution frame, based on the attention reference frame. For example, the AI NN 440 can be trained by using the attention reference frame, and then enhance resolution of the low-resolution frame and remove the aliasing artifacts of the low-resolution frame with its resolution enhanced by only focusing on a portion of the low-resolution frame that corresponds to the key information contained in the attention reference frame.

Figure 5:
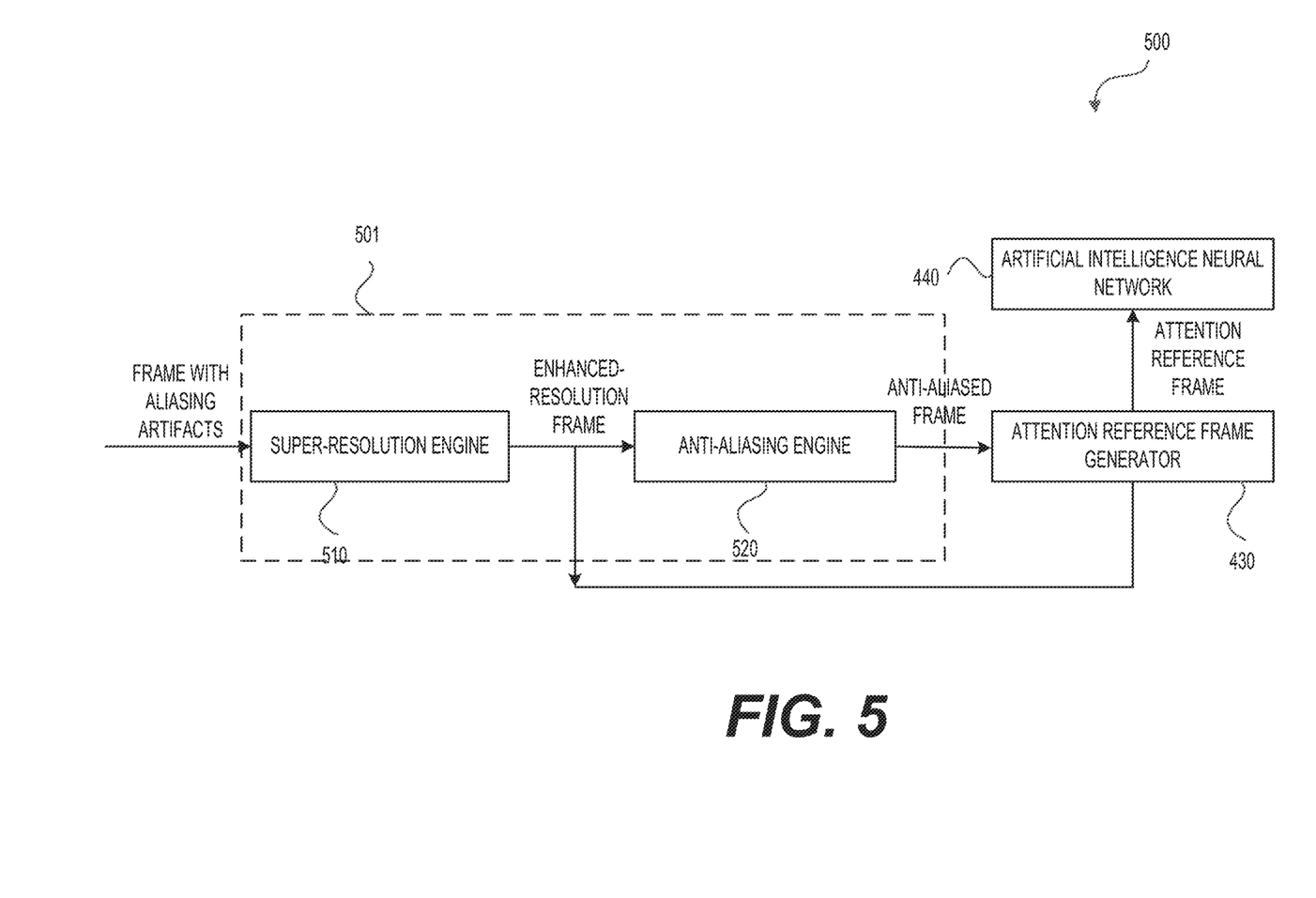
FIG. 5 shows a functional block diagram of an exemplary frame processor for processing frames with aliasing artifacts according to some embodiments of the disclosure.

FIG. 5 shows a functional block diagram of an exemplary frame processor 500 for processing images or frames with aliasing artifacts according to some embodiments of the disclosure. The frame processor 500 can be coupled to the temporal decision circuit 330 or to the frame fusion circuit 340 of the device 300. The frame processor 500 can include a resizer or a super-resolution (SR) and anti-aliasing (AA) engine 501, the attention reference frame generator 430 coupled to the SR and AA engine 501, and the AI NN 440. The SR and AA engine 501 can generate a first high-resolution frame with aliasing artifacts and a second high-resolution frame with aliasing artifacts removed. In an embodiment, the SR and AA engine 501 can include an SR engine 510 that can enhance resolution of a frame that may be with aliasing artifacts to generate an enhanced-resolution frame, e.g., the first high-resolution frame with aliasing artifacts. For example, the SR engine 510 can be an artificial intelligence (AI) SR engine. In another embodiment, the SR and AA engine 501 can further include an AA engine 520 coupled to the SR engine 510 that can remove aliasing artifacts of the enhanced-resolution frame to generate an anti-aliased frame, e.g., the second high-resolution frame with aliasing artifacts removed. For example, the AA engine 520 can be an AI AA engine. In a further embodiment, the AA engine 520 can be disposed in front of the SR engine 510. In such an scenario, one of the frames will have its aliasing artifacts removed by the AA engine 520 first, and then both of the frames will have their resolution enhanced by the SR engine 510. The attention reference frame generator 430 can generate an attention reference frame based on the enhanced-resolution frame and the anti-aliased frame. For example, the attention reference frame generator 430 can compare the enhanced-resolution frame and the anti-aliased frame to capture key information of the enhanced-resolution frame that is distinguishable from the anti-aliased frame.

Figure 6:
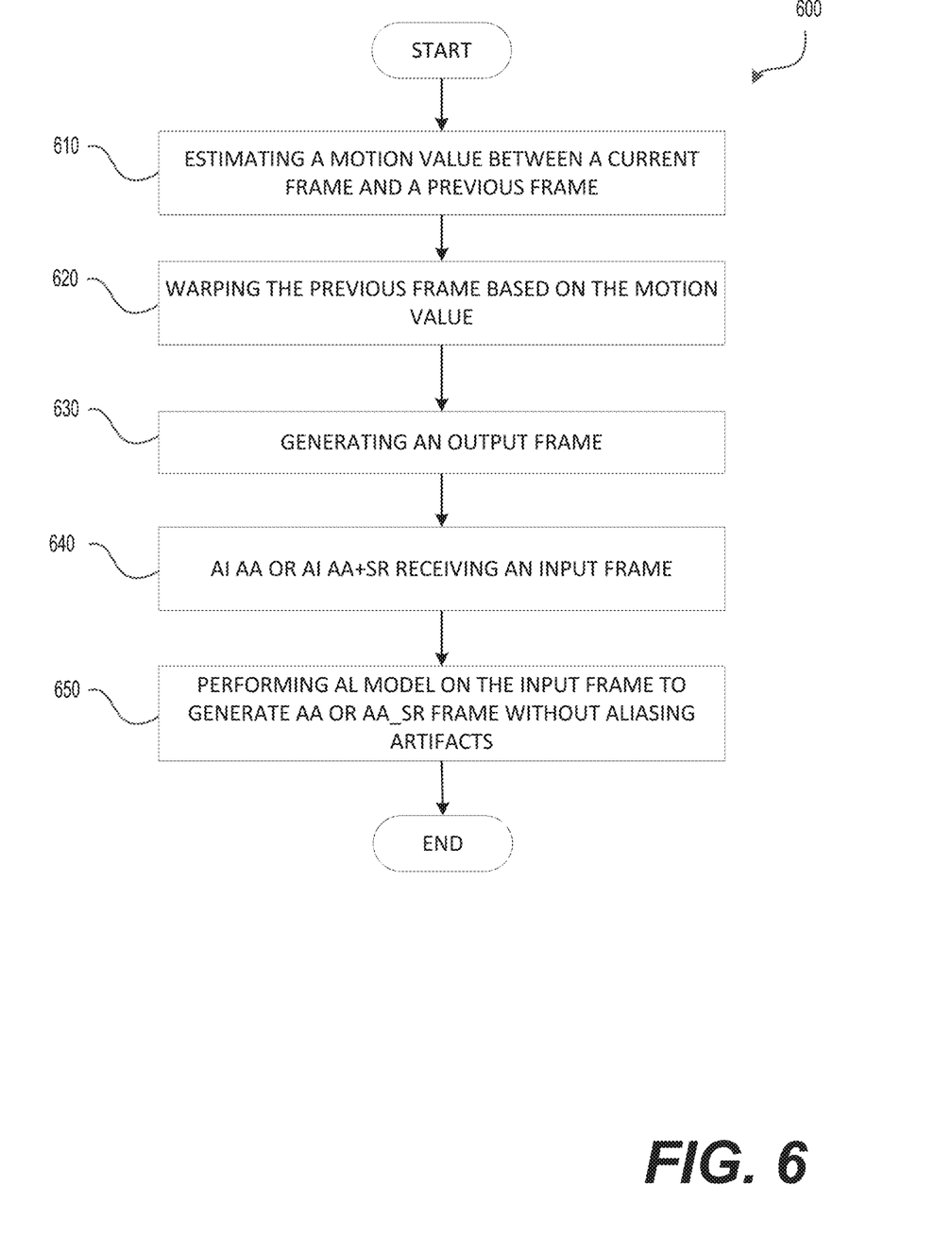
FIG. 6 shows a flow chart illustrating an exemplary method for processing frames with aliasing artifacts according to some embodiments of the disclosure.

FIG. 6 shows a flow chart illustrating an exemplary method 600 for processing images or frames with aliasing artifacts according to some embodiments of the disclosure. The method 600 can provide an additional warped previous frame to a frame processor, e.g., the frame processors 400 and 500, when the frame processors 400 and 500 are removing aliasing artifacts of a low-resolution frame. In various embodiments, some of the steps of the method 600 shown can be performed concurrently, in a different order than shown, can be substituted for by other method step, or can be omitted. Additional method steps can also be performed as desired. Aspects of the method 600 can be implemented by the device 300 illustrated in and describe with respect to the preceding figures.

At step 610, a motion value between a current frame and a previous frame can be estimated.

At step 620, the previous frame can be warped based on the motion value such that the warped previous frame is aligned with the current frame.

At step 630, an output frame can be generated. For example, the output frame can include the current frame and the warped previous frame when the current frame and the warped previous frame are consistent. As another example, the output frame can include only the current frame when the current frame is inconsistent with the warped previous frame. The method 500 can then process the output frame.

At step 640, an input frame, e.g., the output frame, can be input to an AI AA engine or an AI AA+SR engine.

At step 650, an AI model can be performed on the input frame to generate an AA or an AA+SR frame with aliasing artifacts removed.

Figure 7:
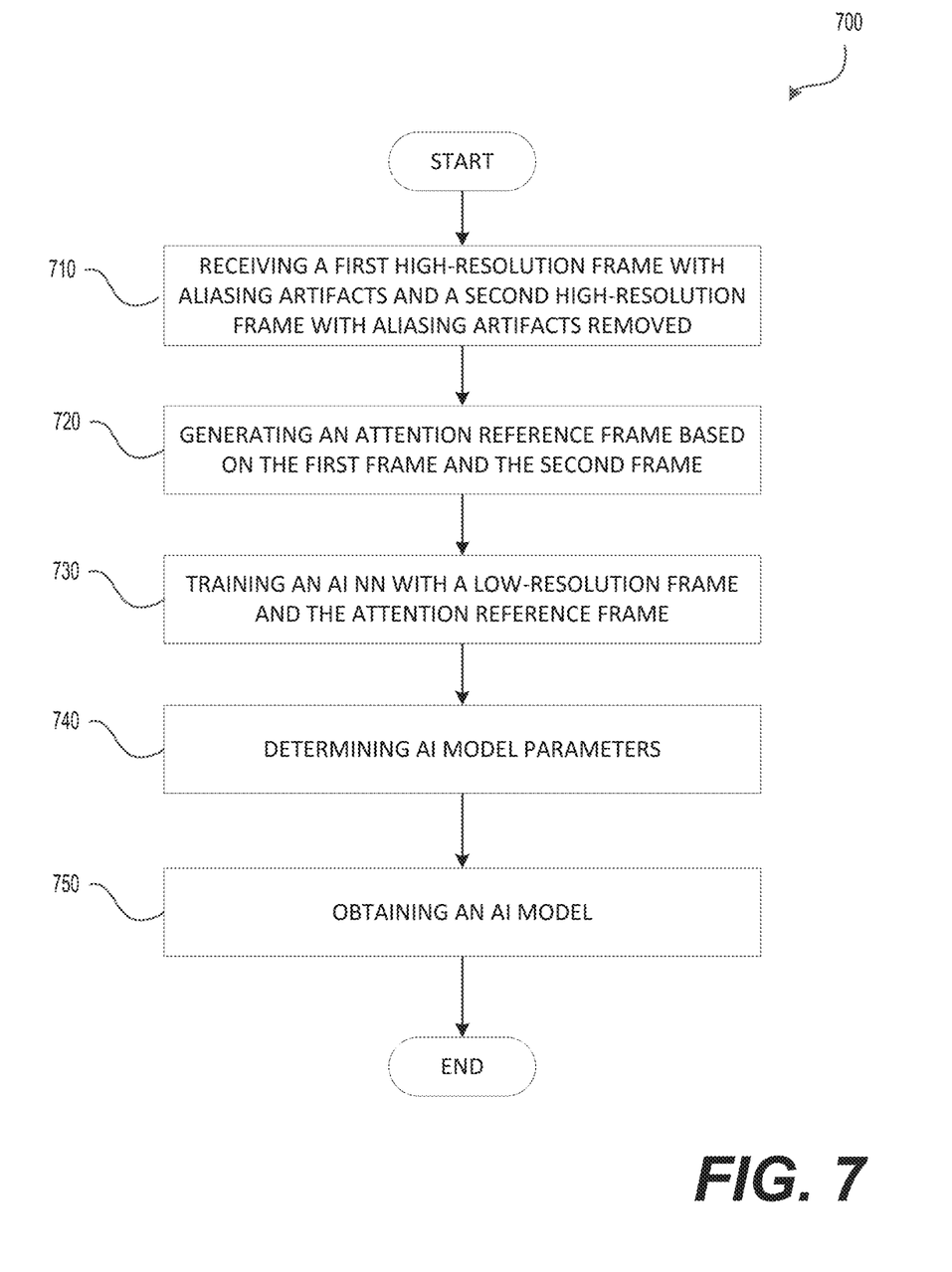
FIG. 7 shows a flow chart illustrating an exemplary method for processing frames with aliasing artifacts according to some embodiments of the disclosure.

FIG. 7 shows a flow chart illustrating an exemplary method 700 for processing images or frames with aliasing artifacts according to some embodiments of the disclosure. In various embodiments, some of the steps of the method 700 shown can be performed concurrently, in a different order than shown, can be substituted for by other method step, or can be omitted. Additional method steps can also be performed as desired. Aspects of the method 700 can be implemented by the frame processors 400 and 500 illustrated in and describe with respect to the preceding figures.

At step 710, a first high-resolution frame with aliasing artifacts and a second high-resolution frame without aliasing artifacts removed are received.

At step 720, an attention reference frame can be generated based on the first frame and the second frame. In a embodiment, the attention reference frame can include key information of the first frame that is distinguishable from the second frame.

At step 730, an AI NN can be trained with a low-resolution frame and the attention reference frame.

At step 740, parameters of an AI model (AA or AA+SR) can be determined.

At step 750, the AI model (AA or AA+SR) with its parameters determined or frozen can be obtained.

In an embodiment according to the disclosure, the motion estimation circuit 310, the warping circuit 320, the temporal decision circuit 330 and the frame fusion circuit 340 can include circuitry configured to perform the functions and processes described herein in combination with software or without software. In another embodiment, the motion estimation circuit 310, the warping circuit 320, the temporal decision circuit 330 and the frame fusion circuit 340 can be a digital signal processor (DSP), an application specific integrated circuit (ASIC), programmable logic devices (PLDs), field programmable gate arrays (FPGAs), digitally enhanced circuits, or comparable device or a combination thereof. In a further embodiment according to the disclosure, the motion estimation circuit 310, the warping circuit 320, the temporal decision circuit 330 and the frame fusion circuit 340 can be a central processing unit (CPU) configured to execute program instructions to perform various functions and processes described herein. In various embodiments, the motion estimation circuit 310, the warping circuit 320, the temporal decision circuit 330 and the frame fusion circuit 340 can be distinct from one another. In some other embodiments, the motion estimation circuit 310, the warping circuit 320, the temporal decision circuit 330 and the frame fusion circuit 340 can be included in a single chip.

The device 300 and the frame processors 400 and 500 can optionally include other components, such as input and output devices, additional or signal processing circuitry, and the like. Accordingly, the device 300 and the frame processors 400 and 500 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A device for processing frames with aliasing artifacts, comprising:
    a motion estimation circuit configured to estimate a motion value between a current frame and a previous frame;
    a warping circuit coupled to the motion estimation circuit that is configured to warp the previous frame based on the motion value such that the warped previous frame is aligned with the current frame and to determine whether the current frame and the warped previous frame are consistent;
    a temporal decision circuit coupled to the warping circuit that is configured to generate an output frame, the output frame including either the current frame and the warped previous frame when the current frame and the warped previous frame are consistent, or the current frame when the current frame and the warped previous frame are not consistent; and a frame processor coupled to the temporal decision circuit that is configured to process the output frame, wherein the frame processor comprises a super-resolution (SR) and anti-aliasing (AA) engine configured to enhance resolution and remove aliasing artifacts of the output frame to generate a first high-resolution frame with aliasing artifacts and a second high-resolution frame with aliasing artifacts removed.

2. The device of claim 1, wherein the frame processor further comprises an attention reference frame generator coupled to the SR and AA engine that is configured to generate an attention reference frame based on the first high-resolution frame and the second high-resolution frame.

3. The device of claim 2, wherein the frame processor further comprises an artificial intelligent (AI) neural network (NN) coupled to the attention reference frame generator that is configured to remove aliasing artifacts of a frame based on the attention reference frame.

4. The device of claim 1, further comprising:
a frame fusion engine coupled to the temporal decision circuit that is configured to fuse the current frame and the warped previous frame.

5. The device of claim 1, wherein the motion estimation circuit estimates the motion value between the current frame and the previous frame using a sum of absolute difference (SAD) method.

6. The device of claim 1, wherein the warping circuit warps the previous frame based on the motion value when the motion value is less than a motion threshold.

7. The device of claim 6, wherein the temporal decision circuit is further coupled to the motion estimation circuit, the temporal decision circuit generating the output frame that includes the current frame when the motion value is not less than the motion threshold.

8. The device of claim 1, wherein the motion estimation circuit is a neural network (NN).

9. A device for processing frames with aliasing artifacts, comprising;
a motion estimation circuit configured to estimate a motion value between a current frame and a previous frame;

a warping circuit coupled to the motion estimation circuit that is configured to warp the previous frame based on the motion value such that the warped previous frame is aligned with the current frame and to determine whether the current frame and the warped previous frame are consistent;

a temporal decision circuit coupled to the warping circuit that is configured to generate an output frame, the output frame including either the current frame and the warped previous frame when the current frame and the warped previous frame are consistent, or the current frame when the current frame and the warped previous frame are not consistent; and a frame fusion engine coupled to the temporal decision circuit that is configured to fuse the current frame and the warped previous frame, wherein the frame fusion engine fuses the current frame and the warped previous frame by concatenating the warped previous frame to the current frame in a channel-wise manner.

10. A method for processing frames with aliasing artifacts, comprising:

estimating a motion value between a current frame and a previous frame;

warping the previous frame based on the motion value such that the warped previous frame is aligned with the current frame;

generating an output frame, the output frame including either the current frame and the warped previous frame when the current frame and the warped previous frame are consistent or the current frame when the current frame and the warped previous frame are not consistent; and enhancing resolution and removing aliasing artifacts of the output frame to generate a first high-resolution frame with aliasing artifacts and a second high-resolution frame with aliasing artifacts removed.

11. The method of claim 10, further comprising generating an attention reference frame based on the first high-resolution frame and the second high-resolution frame.

12. The method of claim 11, further comprising removing aliasing artifacts of a frame based on the attention reference frame.

* * * * *

UNITED STATES PATENT AND TRADEMARK OFFICE
CERTIFICATE OF CORRECTION

PATENT NO. : 11,580,621 B2
APPLICATION NO. : 17/113397
DATED : February 14, 2023
INVENTOR(S) : Cheng-Lung Jen et al.

It is certified that error appears in the above-identified patent and that said Letters Patent is hereby corrected as shown below:

On the Title Page

Item (12), should read:
-- Jen et al. --

Item (72), Inventors:

"Jen Cheng LUNG"
Should read as:
-- Cheng-Lung JEN; --

"Huang TSUNG-SHIAN"
Should read as:
-- Tsung-Shian HUANG; --

Signed and Sealed this
Twenty-ninth Day of July, 2025

Coke Morgan Stewart
*Acting Director of the United States Patent and Trademark Office*